United States Patent [19]
Buck

[11] Patent Number: 5,430,637
[45] Date of Patent: Jul. 4, 1995

[54] METHOD AND APPARATUS FOR POWER SUPPLY WITH GATED CHARGE FILTER

[75] Inventor: Dean C. Buck, Loveland, Colo.

[73] Assignee: Hewlett-Packard Company, Palo Alto, Calif.

[21] Appl. No.: 193,823

[22] Filed: Feb. 9, 1994

[51] Int. Cl.$^6$ .............................................. H02M 5/42
[52] U.S. Cl. .......................................... 363/89; 363/85; 323/908
[58] Field of Search ................. 363/84, 85, 89, 86; 323/908; 361/17, 18, 56

[56] References Cited

U.S. PATENT DOCUMENTS

| | | | |
|---|---|---|---|
| 4,001,668 | 1/1977 | Lewis | 363/89 X |
| 4,675,798 | 6/1987 | Jost et al. | 363/86 X |
| 5,187,653 | 2/1993 | Lorenz | 363/89 |
| 5,307,257 | 4/1994 | Fukushima | 363/89 X |

*Primary Examiner*—A. D. Pellinen
*Assistant Examiner*—Y. Jessica Han
*Attorney, Agent, or Firm*—Edward L. Miller

[57] ABSTRACT

A power supply circuit limits the voltage on a filter capacitor driven by rectified half-cycles of an input AC waveform. A FET switch in series with the current charging the filter capacitor is opened as soon as the charge on the filter capacitor is adequate. A voltage triggered latch circuit is responsive to the rectified AC input applied through a decoupling diode to the filter capacitor, and supplies a control signal to the FET switch. A further sensing circuit can monitor the current charging the filter capacitor, and can trigger the latch to open the FET switch as needed to limit initial in-rush current during the initial application of AC power. The decoupling diode decouples the rectified peaks provided by the rectifiers from the voltage on the filter capacitor. This allows the filter capacitor to charge whenever the rectified input has an instantaneous voltage greater than the capacitor's (and the FET switch is closed), but also allows the output waveform from the rectifier to fall to zero during the zero crossings of the input waveform. That in turn resets the latch, and the process of gating the charge to be accepted by the filter capacitor is then repeated during the next half-cycle of the input AC waveform.

6 Claims, 3 Drawing Sheets

METHOD AND APPARATUS FOR POWER SUPPLY WITH GATED CHARGE FILTER

BACKGROUND AND SUMMARY OF THE INVENTION

The conventional pre-regulator portion of a switching power supply that operates directly off the AC mains must incorporate many components whose ratings are selected to permit operation at 220 VAC, even though the supply might never be used except at 110 VAC. In like fashion, the ultimate end might be a 5 V or 15 V DC supply, but in order to avoid a transformer the AC mains are rectified and applied to a filter, with the expectation that a subsequent switching power supply will preserve efficiency while keeping the overall size of the supply small. This approach results in significant excess energy being stored in the filter capacitor and never used, as well as a very high voltage rating for that filter capacitor. It also requires some very robust rectifiers to withstand the initial flow of current needed to charge the filter, especially at 220 VAC.

These disadvantages can be avoided by not allowing the filter capacitor to charge to a voltage that is greater than needed by the subsequent load. This can be arranged by placing a FET as a switch in series with the filter capacitor. In an ordinary supply the filter capacitor recharges nearly instantly to the instantaneous voltage produced by the rectifier, which means it gets charged to the peak voltage. In the instant supply the FET switch is opened as soon as the charge on the filter is adequate. A voltage triggered latch circuit is responsive to the rectified AC input, which is also applied through a decoupling diode to the filter capacitor. The latch supplies a control signal to the FET switch. A further sensing circuit can monitor the current charging the filter capacitor, and can trigger the latch to open the FET switch as needed to limit (by halting) the initial in-rush current during the initial application of AC power. The filter capacitor will eventually become sufficiently charged that the limiting action ceases. The decoupling diode decouples the rectified peaks provided by the rectifiers from the voltage on the filter capacitor. This allows the filter capacitor to charge whenever the rectified input has an instantaneous voltage greater than the capacitor's (and the FET switch is closed), but also allows the output waveform from the rectifier to fall to zero during the zero crossings of the AC input waveform. That fall to zero in turn resets the latch, so that the process of gating the charge to be accepted by the filter capacitor is repeated during the next half-cycle of the input AC waveform. Because the FET switch is either saturated or off, it dissipates relatively little power, allowing the gated charge power supply to be very efficient.

DESCRIPTION OF A PREFERRED EMBODIMENT

Figure 1:
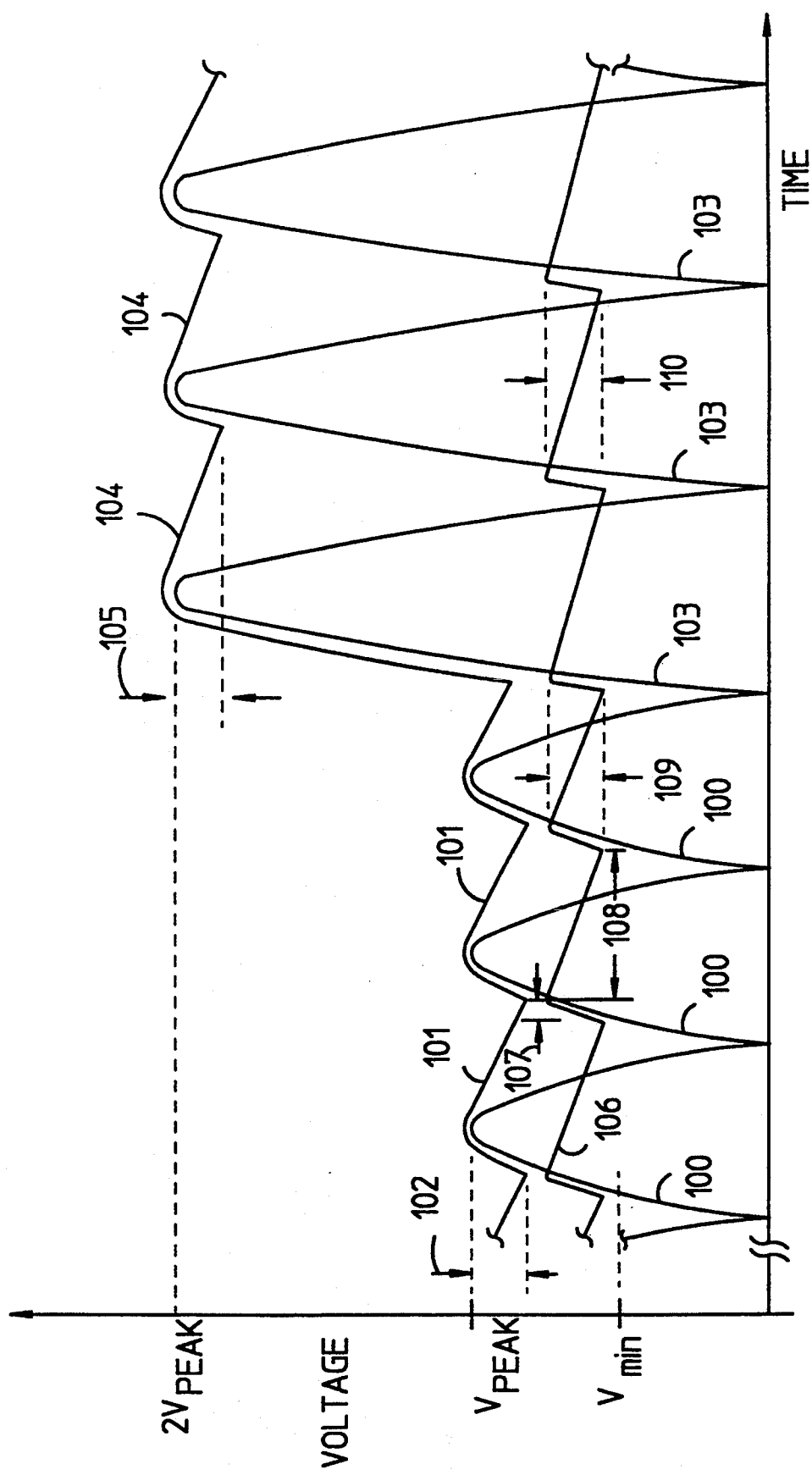
FIG. 1 is a waveform diagram illustrating the operation of the gated charge filter power supply described herein.

Refer now to FIG. 1, wherein is shown a waveform diagram useful in understanding the operation of a power supply incorporating a gated charge filter. Rectified half-cycles 100 have a peak voltage $V_{peak}$ that may be taken to represent operation at a lower of two voltages, say 110 VAC (RMS) and 220 VAC (RMS). If the rectified half-cycles 100 were continuously applied to a filter capacitor shunted by a load, waveform 101 would result. (For clarity of illustration waveforms 101 and 104 are shown displaced slightly above the peaks of the rectified half-cycles 100 and 103. It will be appreciated that in real life they actually overlap in the usual fashion.) Waveform 101 rises to the peak voltage $V_{peak}$ and then drops as the filter capacitor discharges through the load; the discharging of the filter capacitor continues until it is again recharged by the next rectified half-cycle. As a result the waveform 101 exhibits the ripple voltage 102. Now suppose that the AC input were increased to 220 VAC. (Merely for convenience we show this as occurring at a zero crossing). Now waveform 101 increases in voltage to become waveform 104, with a ripple value of 105 (which may or may not be the same as ripple value 102). Rectified half-cycles 103 have a peak value twice that of half-cycles 100: i.e., 2 $V_{peak}$. Note that waveforms 101 and 104 are typical, even in cases where the load needs to be supplied with a much lower minimum DC voltage ($V_{min}$), say, half or a third of $V_{peak}$.

Now observe waveform 106. Its lowest value is at or a little above $V_{min}$, although it could be quite a bit above $V_{min}$, if desired. During periods of time 107 the filter capacitor is allowed to charge. Since the applied AC voltage (generally the AC mains for a switching power supply, but also possibly instead a transformer within the power supply itself) can be expected to provide sufficient current to both supply the load across the filter capacitor and also charge the filter capacitor, the voltage across the filter capacitor rises almost exactly as does that of the rectified half-cycles. After the period of time 107 the capacitor has reached a sufficient voltage to supply the load at acceptable ripple value 109, and do so during time period 108 without benefit of further charging until the next half-cycle. Thus, at the end of time period 107 the filter capacitor is "disconnected" from the rectified half-cycles by turning off a FET switch. A preferred way to do this is to sense the rising voltage of the rectified half-cycles, and set a latch when the sensed voltage reaches $V_{min}$ plus the ripple value 109 (or instead of value 109, perhaps the slightly larger value 110 discussed below). The latch controls the FET switch, and the latch is reset when rectified half-cycles go to zero during the zero crossing of the applied AC input. The load is, of course, in parallel with the filter capacitor at all times.

Now note what happens when the input is raised to 220 VAC. The only significant difference is that the charging time corresponding to time interval 107 will be slightly shorter, owing to the greater dv/dt of the input waveform. Accordingly, the discharge time corresponding to time 108 is slightly longer, since the period of the input waveform is assumed to have not changed. Thus, there is slightly more time for the load to discharge the filter capacitor between recharges, and hence ripple value 110 for 220 VAC operation is slightly larger than its 110 VAC counterpart, 109.

Figure 2:
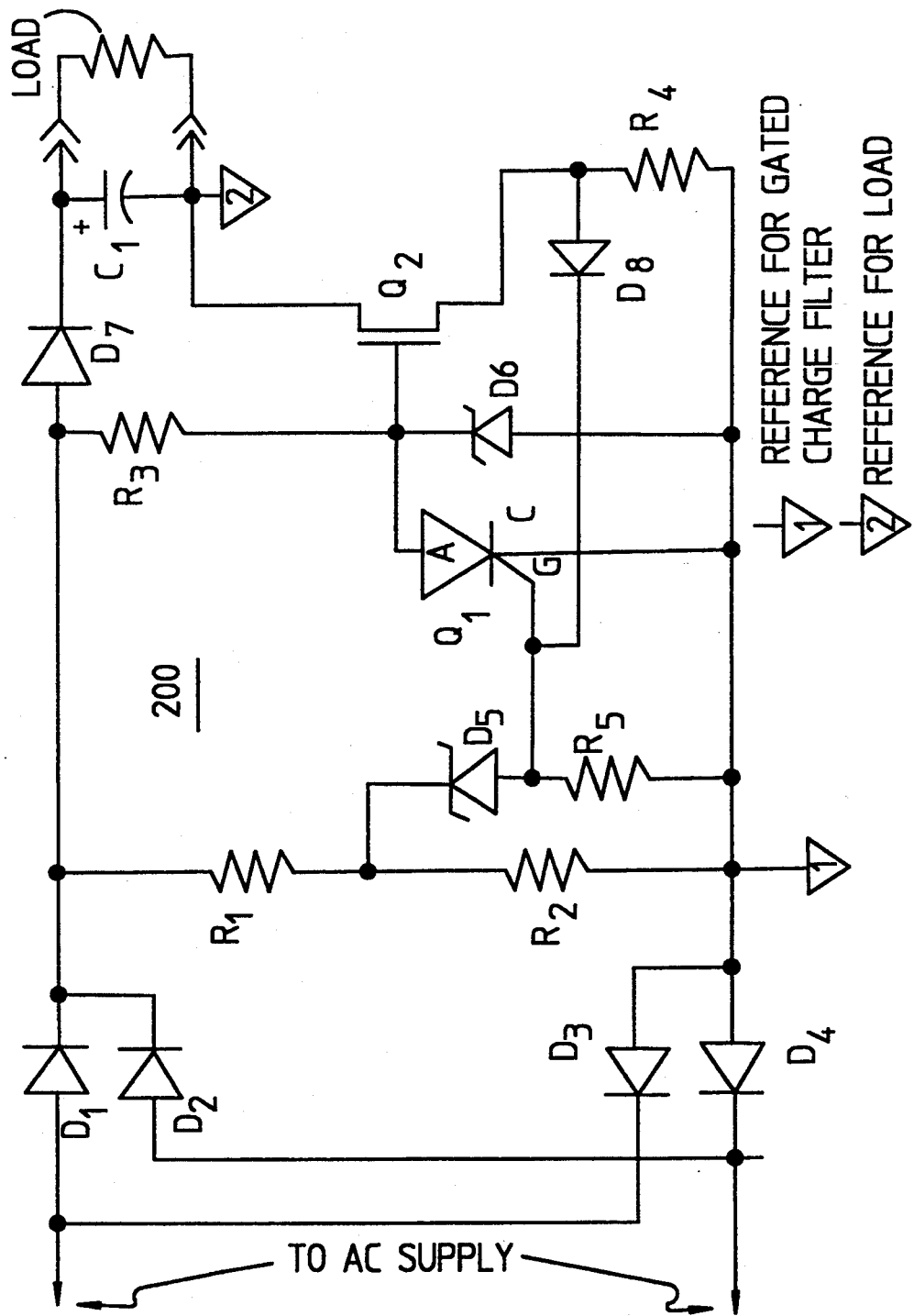
FIG. 2 is a schematic diagram of a first circuit useable as a gated charge power supply.

FIG. 2 shows a circuit 200 that may be used to charge a filter capacitor from rectified half-cycles according to the technique of FIG. 1. In the circuit 200 a source of AC voltage to be rectified and used as DC power is applied to rectifier diodes $D_1$, $D_2$, $D_3$ and $D_4$. The rectifier arrangement shown is the usual bridge rectifier; it will be understood that this is merely illustrative, and that other configurations may be appropriate under other circumstances. And while it is expected that the gated charge filter technique would be of particular interest in situations where (as is common with switching power supplies) the AC mains are themselves the direct source of the AC input, it is by no means limited to those cases. In principle, and without any undue practical limitation, it could just as easily be the case that the rectifier diodes are driven from the secondary of a transformer, and that some other rectifier configuration, such as full wave center tapped, or even half-wave, could be used to obtain the rectified cycles applied to the gated charge filter.

Without filtering, the output of the rectifier diodes $D_1$–$D_4$ is applied to a voltage divider made up of $R_1$ and $R_2$. The output of the voltage divider is coupled by zener diode $D_5$ to $R_5$. The common end of $R_5$ and $R_2$ is the return side of the main rectifier ($D_1$–$D_4$), and serves as $GND_1$, which is the reference for the gated charge filter circuit 200 itself. The function of $R_5$ is to keep $Q_1$ (an SCR) off until zener diode $D_5$ begins to conduct, after which $D_5$ then supplies a voltage drop across $R_5$ and gate current to the gate G of $Q_1$, which then turns the SCR on. In brief, the voltage divider of $R_1$ and $R_2$, in conjunction with $D_5$'s zener voltage, is selected to turn $Q_1$ on when the rising edge of the rectified half-cycle reaches a sufficiently high value (i.e., at the end of time period 107 in FIG. 1).

The rectified AC input (half-cycles 100, 103) is also applied to a bias network formed from $R_3$ and zener diode $D_6$, as well as to filter capacitor $C_1$ via isolation diode $D_7$. The bias network allows the rectified half-cycles to turn a FET switch $Q_2$ on, provided SCR $Q_1$ is off. The zener diode $D_6$ limits the turn-on drive to FET switch $Q_2$ to a reasonable value. With $Q_2$ on, filter capacitor $C_1$ will charge (time period 107) whenever the instantaneous value of the voltage from the rectifier diodes $D_1$–$D_4$ exceeds the voltage on $C_1$ by the forward voltage drop of $D_7$. $Q_2$ is not allowed to remain on indefinitely, however. When the input voltage reaches the minimum safe value for ripple given the maximum allowable load, the input voltage divider of $R_1$ and $R_2$ (via $D_5$) triggers SCR $Q_1$. That shorts out zener diode $D_6$ and removes the turn-on drive for $Q_2$, which then turns off. In turn, that stops the charging of $C_1$. Isolation diode $D_7$ decouples the voltage of the stored charge on $C_1$ from the input voltage divider of $R_1$ and $R_2$, as well as from the anode of the SCR, thus ensuring that the SCR will be turned off at the end of each rectified half-cycle.

The capacitance of $C_1$ and the voltage at which the SCR $Q_1$ is triggered are chosen in light of the current drawn by the load and the allowable ripple. Note that the voltage rating on $C_1$ needs to be only a safe amount higher than the peak value supplied to the load, rather than the peak value of the rectified half-cycles. That difference can be considerable: say, 10 WVDC versus 350 WVDC.

The remaining components in the circuit 200 are $R_4$ and $D_8$. $R_4$ is a current sensing resistor. The effective value of $R_4$, when in parallel with the series combination of forward biased $D_8$ and $R_5$, is chosen to trigger the SCR whenever the current through the series combination of $Q_2$ and $C_1$ exceeds a safe value, as it otherwise could for in-rush current during the initial application of AC power. Diode $D_8$ keeps $R_4$ from being a load on $D_5$.

Figure 3:
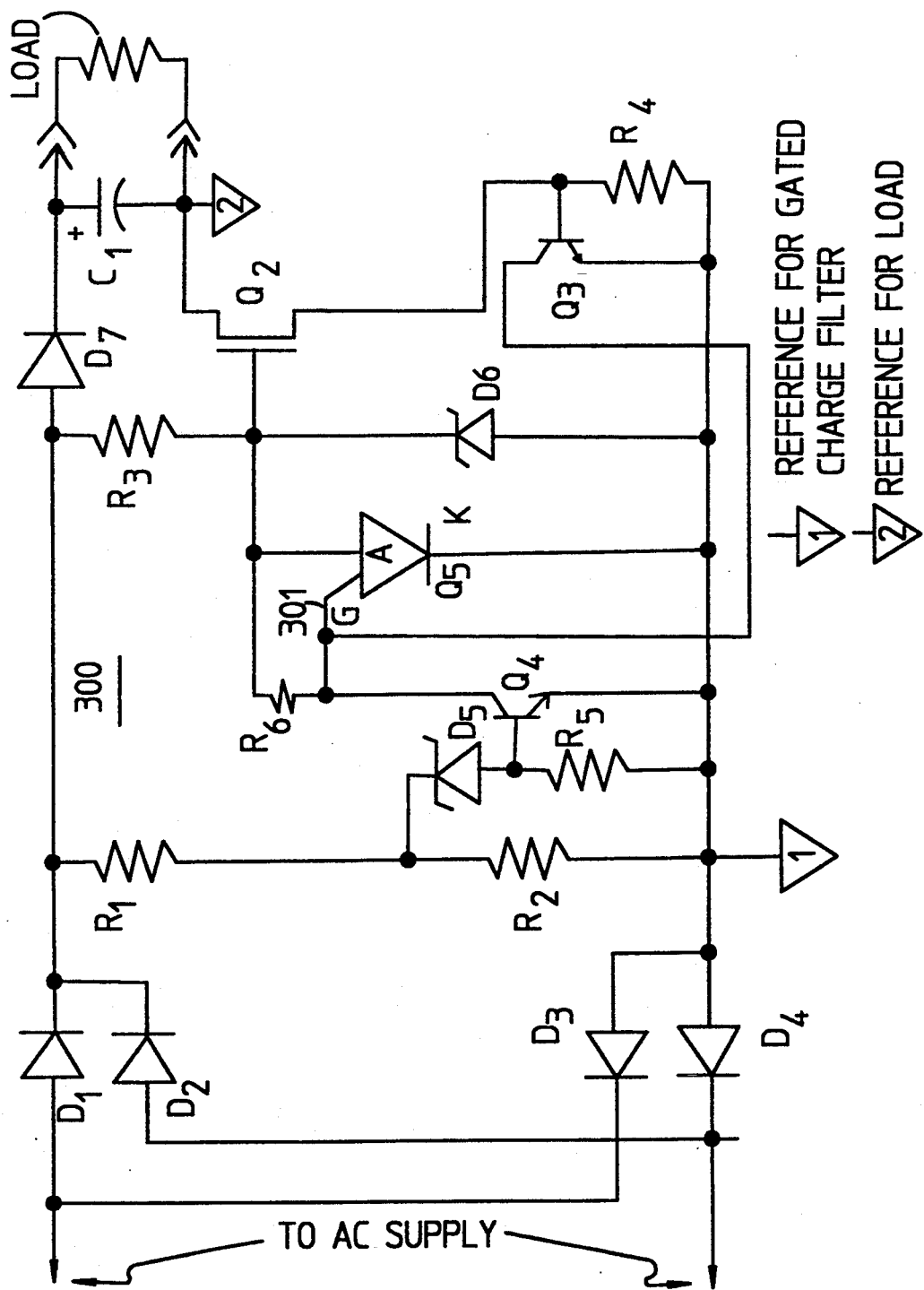
FIG. 3 is a schematic diagram of a second circuit useable as a gated charge power supply.

FIG. 3 shows a schematic for a circuit 300 similar to circuit 200 of FIG. 2. The similarities are sufficient to permit like components to be given the same identifiers. The circuit 300 of FIG. 3 operates in very much the same fashion as the circuit 200. The difference is that SCR $Q_1$ has been replaced by $Q_5$, which is either a "complementary" SCR or a unijunction transistor. Also, transistors $Q_3$ and $Q_4$ are added to invert the triggering voltages developed across $R_4$ and $R_5$ and thus match the sense of the control lead 301 for $Q_5$ (connecting it to $GND_1$ causes triggering). They also provide gain that results in more abrupt and more predictable triggering points.

The symbol used for $Q_5$ in FIG. 3 may be unfamiliar or confusing to some. To some it would suggest the "complementary" SCR configuration, where the intermediate N layer of the internal PNPN SCR structure is used as the control lead, rather than the intermediate P layer as is the case for the standard garden variety SCR. Such a suggestion and conclusion would not be unproductive, as that exact situation would work without difficulty. However, the circuit 300 of FIG. 3 was actually constructed with a Motorola 2N6028, for which Motorola shows exactly the symbol used in FIG. 3 (including the A for anode, K for cathode and G for gate), even though the device is described as a "silicon programmable unijunction transistor" (PUT). Unijunction transistors have also been previously described by others as having an emitter and two bases, and denoted with a symbol similar to that used for junction FET's. Any such difference need not be of concern or a source of confusion here, since any of a variety of latching circuit elements could be used (perhaps with minor changes to accommodate the logic of triggering) in place of either $Q_1$ (of FIG. 2) or $Q_5$ (in FIG. 3). The list of such individual devices includes SCR's, complementary SCR's, silicon controlled switches, GTO's, TRIAC's, four-layer diodes, and unijunction transistors. Compound circuit elements, such as threshold detectors, schmitt triggers and flip-flops, could be used as well, provided the appropriate latching and reset functions are provided. All in all, SCR's and unijunctions are probably the simplest and cheapest solutions, and appear to have no disadvantages.

Finally, it will be understood that the load shown in FIG. 2 and FIG. 3 could be another power supply (linear or switching) or simply a device that is the end consumer of the power supplied. $GND_2$, which is the common point between filter capacitor $C_1$ and FET switch $Q_2$, may serve as the reference point for the load (although the point of reference for the load could just as easily be the other end of the filter capacitor.)

I claim:

1. A method of converting an AC input voltage to DC comprising the steps of:
   rectifying the AC input voltage to produce a time variant DC voltage that periodically rises to a peak value and that periodically falls to zero;
   charging a filter capacitor with the rising edge of the time variant DC voltage until the instantaneous value of the time variant DC voltage reaches a preselected value less than the peak value decoupling the time variant DC voltage from the voltage on the filter capacitor so that the time variant DC voltage may decrease below the voltage to which the filter capacitor has become charged;

subsequent to the rising edge of the time variant DC voltage reaching the preselected value, opening a switch in series with the current path through which the filter capacitor charges; and closing the switch when the time variant DC voltage falls to zero.

2. A method as in claim 1 further comprising the steps of monitoring the magnitude of the current that charges the filter capacitor and opening the switch in response to the magnitude of the charging current reaching a selected value.

3. Apparatus for converting an AC input voltage to DC to be supplied to a load, the apparatus comprising:

a first rectifier that receives the AC input voltage and produces therefrom between first and second nodes a time variant DC voltage that periodically rises to a peak value and that periodically falls to zero;

a second rectifier coupled at a first node thereof to the first node of the first rectifier;

a filter capacitor coupled at a first node thereof to a second node of the second rectifier;

a switch coupled between a second node of the filter capacitor and the second node of the first rectifier, and having a switch control node that determines whether the switch is on or off;

a voltage divider coupled between the first and second nodes of the first rectifier;

a latch coupled between the switch control node and the second node of the first rectifier and having a latch control node coupled to an interior location within the voltage divider, the latch causing the switch to be off subsequent to the voltage at the interior location of the voltage divider exceeding a selected value, and to remain off until the time variant DC voltage falls to zero; and a bias network coupled between the first and second nodes of the first rectifier and having a bias output that is coupled to the switch control node and that causes the switch to be on except when the latch causes it to be off.

4. Apparatus as in claim 3, further comprising a current sensor in series with the switch and having an output coupled to the latch control node, the current sensor causing the latch to cause the switch to be off subsequent to the magnitude of the current through the switch reaching a selected value.

5. Apparatus as in claim 3 wherein the latch comprises an SCR.

6. Apparatus as in claim 3 wherein the latch comprises a unijunction transistor.

* * * * *